Figure 1:
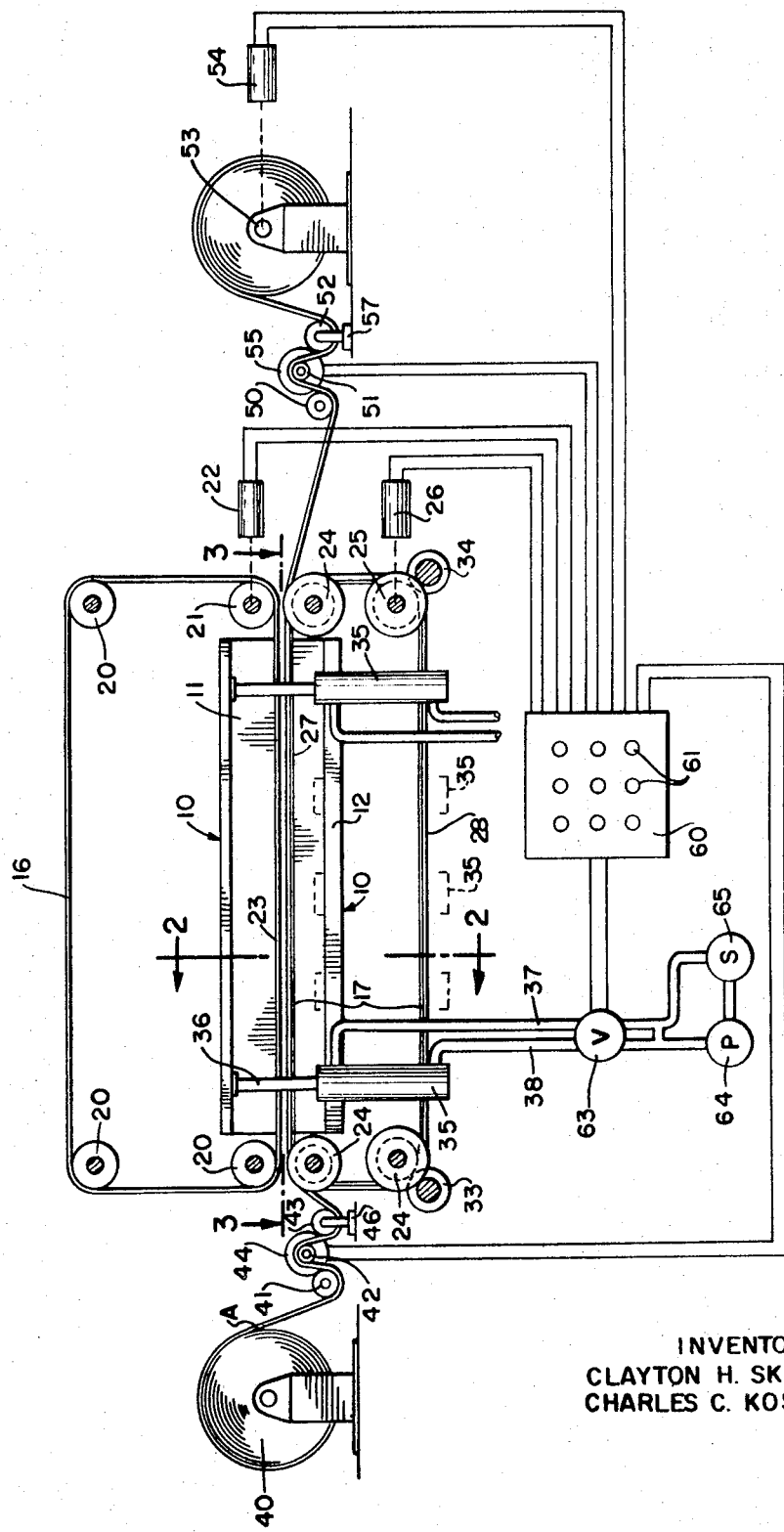

United States Patent

[11] 3,594,866

[72] Inventors Clayton H. Skinner
 Buffalo, N.Y.;
 Charles C. Kosa, Willowdale, Ontario, Canada
[21] Appl. No. 789,713
[22] Filed Jan. 8, 1969
[45] Patented July 27, 1971
[73] Assignee Hewitt-Robins Incorporated
 Stamford, Conn.
 by said Skinner

[54] AUTOMATED BELT PRESS
 6 Claims, 3 Drawing Figs.
[52] U.S. Cl. .................................................. 18/6 E,
 18/4 B, 18/17 B
[51] Int. Cl. ................................................ B29h 3/00
[50] Field of Search ............................................ 18/4 B, 4 V,
 4 P, 4 S, 6 E, 6 V, 6, 17 B

[56] References Cited
 UNITED STATES PATENTS

| | | | |
|---|---|---|---|
| 362,597 | 5/1887 | Bassett et al. | 18/17 B X |
| 1,842,646 | 1/1932 | Atkins | 18/17 B |
| 2,327,566 | 8/1943 | Slusher | 18/17 B |
| 2,509,354 | 5/1950 | Jones et al. | 18/4 B UX |
| 2,528,168 | 10/1950 | Paulsen | 18/6 E X |
| 2,585,915 | 2/1952 | Chavannes | 18/6 E X |
| 2,602,188 | 7/1952 | Gorecki | 18/6 E UX |
| 2,668,987 | 2/1954 | Harris et al. | 18/6 E X |
| 2,753,591 | 7/1956 | Stevens et al. | 18/6 E X |
| 2,865,047 | 12/1958 | Mason | 18/6 E X |
| 2,867,845 | 1/1959 | Sauer | 18/17 B |
| 2,981,307 | 4/1961 | Malackey | 18/6 E X |
| 3,024,496 | 3/1962 | Colombo | 18/4 S X |
| 3,071,805 | 1/1963 | Merkle | 18/4 B X |
| 3,206,009 | 9/1965 | Wahl | 18/6 E X |
| 3,257,484 | 6/1966 | Barnette | 18/4 B UX |

Primary Examiner—J. Howard Flint, Jr.
Attorneys—J. L. Shortley and J. D. Boos

ABSTRACT: The disclosure relates to an apparatus and method for curing ribbonlike stock of curable material in successive longitudinal segments. In accordance with the invention, there is provided a bed press having two opposed platens, presenting confronting substantially flat pressing surfaces and defining a curing zone therebetween. An endless belt around one of these platens has a run passing through the curing zone between the platens, and the stock in the form of a continuous ribbon is delivered intermittently in successive segments through said zone and onto said belt run. Means are provided for moving the platens relatively towards and away from each other. In the operation of carrying out a cycle of the process of the present invention, a longitudinal segment of raw stock is pulled from a source of supply and delivered onto the belt run in the curing zone, the platens are moved relatively towards each other to clamp the stock segment between the belt run and the platen outside the belt run, and the stock is heated to curing temperature, while the stock, the belt and the platens are stationary. At the end of the curing period, the platens are moved relatively apart, the belt is operated to move the run on which the stock was placed for curing, our of the curing zone, and to move the net portion of the belt into the curing zone, and at the same time, the cured stock is moved with the belt run out of the curing zone to a windup, while the next successive segment of raw stock is moved into the curing zone. The cycles are repeated.

INVENTORS
CLAYTON H. SKINNER
CHARLES C. KOSA

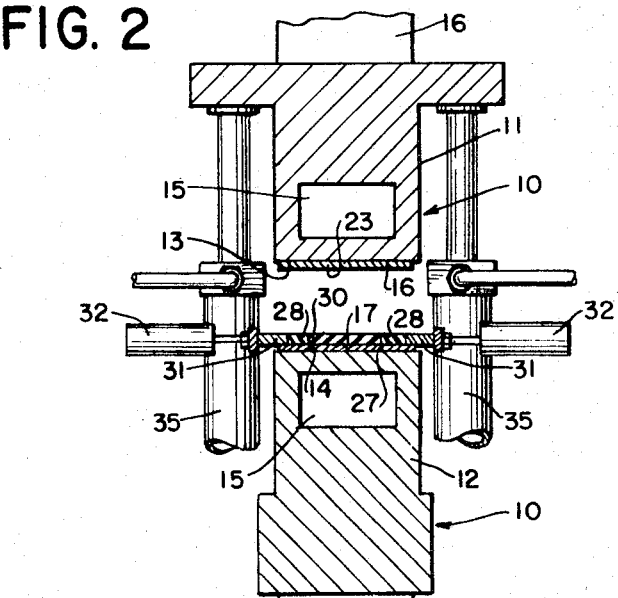
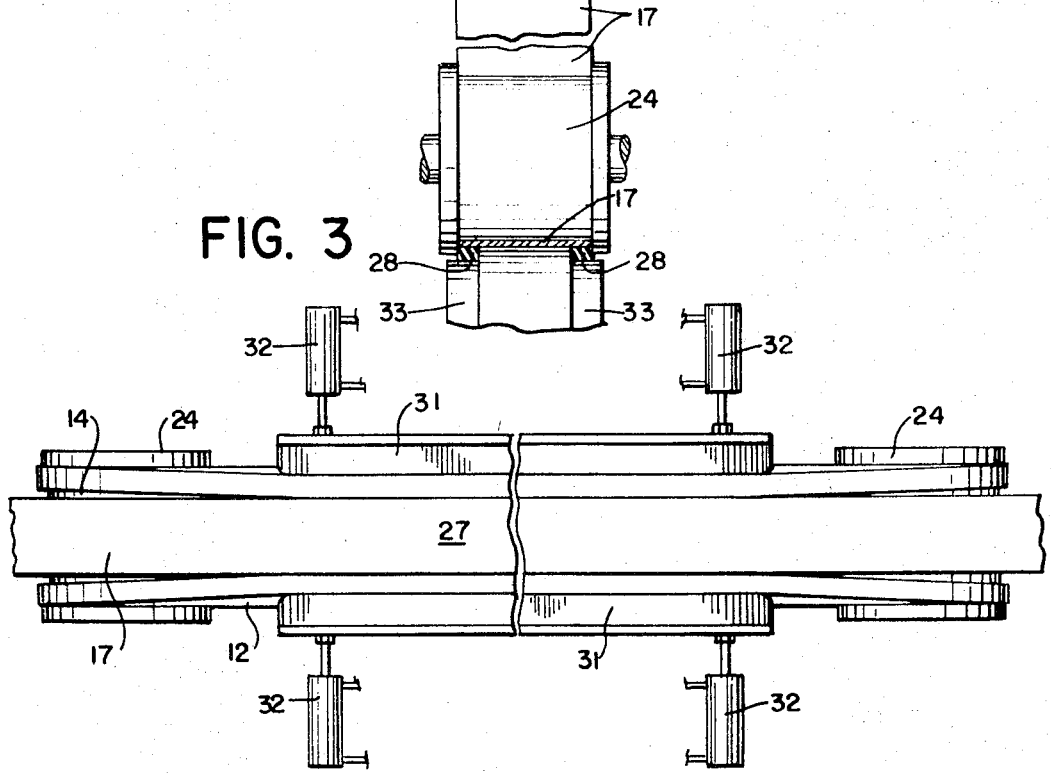

AUTOMATED BELT PRESS

The present invention relates to an apparatus for curing ribbonlike products containing elastomers such as natural or synthetic rubber.

A standard flat bed vulcanizing press for curing rubber/fabric laminated stock in ribbon form for use, for example, in making conveyor belts, consists of two or more platens, pressed against opposite faces of the stock, usually under hydraulic ram pressure. Stock of varying widths and thicknesses, are heat-cured by such presses by manually placing edge irons with suitable blocks and wedges on the platens to define the required width and thickness. The raw or green stock is fed into the press with a leader to the windup, and after each curing period, the stock, which sticks to the platens, must frequently be "paddled" loose from the platens, and the platens must be cleaned with brushes in preparation for the next curing cycle. This operation disrupts the setting of the edge irons, requiring them to be reset for each curing cycle, is time-consuming and requires excessive manpower.

Also, in the conventional flat press described, the stock is clamped at the ends of the press and stretched, causing localized stretching at the areas of temperature change at the ends of the press. This causes uneven tensioning of the stock.

Another conventional method of vulcanization is by the so-called "rotocure" system in which the stock is cured between a heated drum mounted on a horizontal axis, and a steel band. This rotocure operation is slow and affords limited and uneven pressures on the product to be cured compared to the pressure attainable between compressing flat platens in horizontal planes. Also, this rotary type of press limits the character of product which may be cured because lack of sufficient pressure, especially for products of thicker gauges, may result in lack of consolidation of the different components of the laminated product and insufficient cure. Also, the operation of placing edge controlling devices on the rotocure apparatus is damaging to the expensive steel band, and is time consuming.

One object of the present invention is to provide a new and improved apparatus for curing ribbonlike stock containing elastomer, having the advantages of flat bed press but overcoming the disadvantages of prior art equipment referred to above.

In accordance with certain features of the present invention, there is employed a flat heat-curing bed press, functionally and structurally correlated with a device for delivering the raw stock to be cured in successive sections into the curing field of the press and for discharging the successive cured sections from the press and for winding the cured section on a drum. A conveying device comprising an endless belt has a straight run extending along one of the press platens, and the successive raw sections of the stock are delivered by the delivery and windup device in face to face contact with said belt. During each curing period for each successive segment of the stock, the conveying device remains inactive with the stock in the closed press. At the end of each curing period, the press is opened and the conveyor device is activated, while the cured segment of the stock is moved by means of the stock delivery and windup device longitudinally in tandem with the adjoining flat run of the conveyor belt out of the curing field of the press and through the exit end of the press to the windup drum. This causes the cured stock segment to be stripped easily and neatly off the conveyor belt as it emerges from the exit end of the press. At the same time, the stock delivery and windup device feeds the next raw segment of the stock to be cured through the inlet end of the press into the curing field of the open press for the next curing operation.

As another feature of the present invention, the stretch of stock along the press is uniformly tensioned before and after cure by roller tensioning means forming part of the stock delivery and windup device.

The edge forming devices in the system of the present invention could comprise endless bands mounted for movement with the conveyor belt.

The features of the present invention described eliminate the problems involved and the manpower required in the "paddling" of the cured segment of the stock loose from the press platens and in the resetting of the edge irons at the end of each curing cycle, and cause the pressure and tension on the stock to be applied uniformly.

Various other objects, features and advantages of the present invention are apparent from the following description and from the accompanying drawings, in which:

FIG. 1 is a diagrammatic side view of the system embodying the present invention, and shown directly after a segment of the stock has been cured and the press is open to permit removal of this segment of the stock from the press and the feeding of the next successive segment of raw stock into the press, certain parts of the system relating to the means for moving the edging bands into contact with the sides of the stock prior to curing being eliminated for the sake of simplifying the view;

FIG. 2 is a section of the system taken on lines 2-2 of FIG. 1, but shown on a larger scale, and showing in addition, the parts eliminated from FIG. 1 and FIG. 3 is a top plan view of part of the system taken on lines 3-3 of FIG. 1 and showing in addition the parts eliminated from FIG. 1.

Referring to the drawings, the apparatus of the present invention has a flat bed press 10 comprising two superposed horizontal platens 11 and 12, relatively movable towards and away from each other by means to be described, to open or close the press. In the specific form shown, the lower platen 12 is supported on a suitable foundation in fixed position, while the upper platen 11 is hydraulically moved cyclically vertically towards and away from the lower platen. The two platens 11 and 12 present flat confronting horizontal pressing surfaces 13 and 14 respectively and may be heated in any suitable manner, as for example, by electricity or by heating fluid, such as steam, circulated through chambers 15 formed in said platens respectively.

An endless belt 16 surrounds the top platen 11 and an endless conveyor belt 17 surrounds the bottom platen 12. These endless belts 16 and 17 may be of steel, Teflon-coated steel mesh, silicone or other material, suitable to withstand flexing, the heat of repetitive vulcanization, the tension applied to the belts and the other conditions to which the belts are subjected. In the specific form shown, the belts 16 and 17 are made of steel.

The upper belt 17 is trained around a series of idler pulleys 20 and a drive pulley 21, driven by a motor 22, and has a straight flat run 23 at the bottom, extending below and along the pressing surface 13 of the upper platen 11, almost in face to face contact therewith, when the press is open, as shown in FIG. 2.

The lower conveyor belt 17 is trained around a series of idler pulleys 24 and a drive pulley 25, driven by a motor 26 at a speed to cause the lower belt to travel at the same linear speed as the upper belt 16, during different phases of operation, and has a straight flat run 27, extending above and along the pressing surface 14 of the lower platen 12, at least in close proximity thereto, if not in actual contact therewith, when the press is open, as shown in FIG. 2. A pair of flexible, substantially parallel, endless, laterally spaced edging or filler bands 28, extend conformably around the entire lower conveyor belt 17 and are secured and mounted on said lower conveyor belt for movement therewith. These edging bands 28 may be made of some suitable flexible material, such as plastic coated fabric or a hard, rubber type material, and define with the other surface of the lower conveyor belt 17 a curing mold trough 30 of substantially rectangular cross section, having a width greater than the width of the raw ribbon stock A to be cured, to permit easy entry therein of a longitudinal segment of this raw stock, as said segment is fed into the field of action of the press 10, and having a height less than the height of said stock segment, to permit said stock segment to be compressed and compacted upon the closing of the press on said stock segment. The stock A may be of the type employed in the manufacture of conveyor belts, and for that purpose, may constitute a laminated structure comprising rubber and fabric. The cure under pressure vulcanizes the rubber, expels the air from the stock and consolidates the different layers and components of the stock A.

The two edging bands 28 are frictionally retained on the lower belt 17 to cause said bands to travel longitudinally with said belt, and are flexible and slack enough to permit the sections of said bands along the upper run of the lower belt to be flexed transversely inwardly relative to said belt into contact with the longitudinal sides of the raw ribbon stock A to be cured, prior to the downward movement of the lower run of the upper belt 16 onto the curing trough 30. For the purpose of so flexing the upper runs of the edging bands 28, there is provided a pair of parallel cam plates 31, flanking the sections of the two edging bands 28 extending along the upper run of the lower belt 17 and operated by hydraulic cylinders 32. These hydraulic cylinders 32 advance these sections of the edging bands 28 inwardly against the sides of the raw ribbon stock A prior to the curing cycle and retract the cam plates 31 away from the sides of the stock A after the stock has been cured.

To prevent the edging bands 28 from slipping off the lower belt 17 in the regions beyond the field of operation of the cam plates 31, the pulleys 24 and 25 around which the belt 17 is trained are flanged to form limiting shoulders for said bands. To maintain the edging bands 28 spread apart the necessary distances in the regions beyond the field of operation of the cam plates 31, there are provided spacing idler pulleys 33 and 34 cooperating with the lower idler pulley 24 and the drive pulley 25 respectively, as shown in FIGS. 1 and 2. With this arrangement, the edging bands 28, as they move along the region remote from the upper run of the belt 17, are spaced apart sufficiently to permit a section of the raw ribbon stock A to be laid easily in the space between said edging bands as said edging bands move in the region between the confronting runs of the two belts 16 and 17.

The upper belt 16 has a width substantially the same as that of the lower conveyor belt 17 to serve as a cover for the curing trough 30 during the curing cycle when the press is closed.

As described, the two platens 11 and 12 are relatively movable vertically to permit the press 10 to be opened and closed, and for that purpose, the lower platen 12 is supported on a foundation in fixed position while the upper platen 11 is moved by a hydraulic ram system shown comprising two rows of fixed vertical hydraulic cylinders 35 on opposite sides of the press 10, having respective pistons therein, and movable piston rods 36 connected to said pistons respectively and to said upper platen 11 respectively. Each cylinder 35 has two hydraulic lines 37 and 38, connected to opposite ends thereof, alternating as pressure line and suction line under a programmed control according to the desired movement of the upper platen 11.

The upper belt 16 has enough slack and flexibility, so that when the hydraulic system is controlled to bring the upper platen 11 down for a pressure, heat-curing cycle, the lower run 23 of the upper belt will follow said platen downwardly, until said belt run presses the raw stock A in the curing through 30.

The device for delivering the raw stock A to the press 10 and for discharging the cured stock from the press and winding it up comprises a letoff roll 40 on which the raw stock is wound, located near the entrance end of the press, and a set of stock tensioning and guiding rolls 41, 42 and 43 leading the raw stock A towards the entrance end of the press 10. The roll 42 is driven by a motor 44 to assist in the feeding of a segment of the raw stock A into proper association with the edging or filler bands 28 and the lower conveyor belt 17 for entry into the curing trough 30 defined by said elements, and at least one of these rolls, as for example, the roll 43, is mounted for adjusting movement into position to apply tension to the stock. For that purpose, the ends of the roll 43 are supported, as for example, on bearing blocks, mounted in guides 46 for downward tension applying adjustment.

Another set of stock tensioning and guiding rolls 50, 51 and 52 is provided near the exit end of the press 10 and a windup roll 53 beyond said rolls, driven by a motor 54, winds up the cured stock A. The roll 51 is driven by a motor 55 to assist in the pulling of the stock A through the press 10, and at least one of these rolls, as for example, the roll 52, is mounted for adjusting movement into position to apply tension to the stock. For that purpose, the ends of the roll 52 are supported, as for example, on bearing blocks mounted in guides 57 for downward tension applying adjustment.

The motors 44, 54 and 55 in the stock delivery and windup device are operable to move the stock A longitudinally during periods between curing cycles through the press 10 at a linear speed equal to that of the belts 16 and 17 during said periods.

In the operation of the apparatus so far described, with the upper heated press platen 11 raised above the lower heated press platen 12 and the belts 16 and 17 immobilized, the initial longitudinal segment of the stock A to be cured is threaded through the tensioning and guiding rolls 41, 42 and 43, in and along the curing trough 30 and through the open press 10, and the leading end of the stock is threaded through the set of tensioning and guiding rolls 50, 51 and 52 and connected to the windup roll 53. With the stock A so threaded, the tensioning rolls 43 and 52 are moved downwardly to apply tension to the section of the stock between said sets of rolls, the cam plates 31 are moved inwardly by operation of the hydraulic cylinders 32 to flex the sections of the edging bands 28 along the upper run of the belt 17 inwardly against the sides of said stock, and the upper heated platen 11 is lowered under hydraulic pressure, to bring the lower run 23 of the upper belt 16 against the tensioned section of the stock A in the curing trough 30 to apply heat and molding pressure to said stock.

The press is maintained in closed position for a period of time to effect the necessary cure, the length of this period depending on the width and thickness of the stock A to be cured and its composition. At the end of the curing cycle, the upper press platen 11 is hydraulically raised to open the press 10, but the lower run 23 of the upper belt 16 will adhere to the cured stock A in the trough 30 and will not, therefore, follow the upper platen 11 in its upward movement. After the upper platen 11 has been raised as described, the two cam plates 31 are retracted away from each other, to release the cured belt stock A from side pressure and the two belts 16 and 17 are activated by turning on the motors 22 and 26 in directions to cause the confronting horizontal runs 23 and 27 of said belts to move in unison at the same linear speed towards the exit end of the press 10. At the same time, the motors 44, 54 and 55 in the stock delivery and windup device are energized to move the cured segment of the stock A out of the press 10 with the belt runs 23 and 27 at the same linear speed and towards the windup roll 53 and to feed the next successive raw segment of the stock into the press into the same position as described for the initial raw segment of the stock.

The stock A in the press is maintained under tension continuously prior to cure, during cure and after cure, and since this tensioning is effected by the roll tensioning device described, the tension and resulting stretch is uniform along the full length of each stock segment between the tensioning rolls 43 and 52. This operation eliminates cyclic tensioning during manufacture.

The ends of the press platens 11 and 12 may be water-cooled to taper the cure at these ends and to avoid double curing when there is heat cure overlap at these ends.

In the operations described, as the cured segment of the stock A emerges from the exit end of the press, the two belts 16 and 17 adhering to opposite faces of said segment peel and strip away cleanly and easily from this segment, without any manual assistance involving paddling and scraping, while the cured segment between these belts proceeds towards the windup roll 53. The edging or filler bands 28 remain on the conveyor belt 17 in proper condition for repeated use and if cleaning of the belts 16 and 17 and of the edging bands 28 is required after each curing cycle, this can be accomplished outside the press by suitable scraping and cleaning devices and fluids during the periods when these belts and bands are in motion without interrupting any of the cyclic operations carried out.

The cyclic operations described can be repeated over and over again until the entire length of stock A has been treated, whereupon a new length of raw stock A is threaded in the machine.

The different cyclic operations can be controlled through a control system comprising a control panel 60 having suitable indicators and control buttons 61 connected electrically to the motors 22, 26, 44, 54 and 55, to a valve 63, to a pressure pump 64 and to a suction pump 65. The hydraulic lines 37 and 38 to and from each cylinder 35 are shown connected to the valve 63, which is operated to connect the pressure pump 64 and the suction pump 65 alternately to said hydraulic lines according to whether the press platen 11 is to move upward or downward. For simplification purposes, the pumps 64 and 65 and the valve 63 are shown directly connected to the hydraulic lines 37 and 38 of a single hydraulic cylinder 35, but in actual practice, these would be connected to two manifold headers, one of which would be connected to the hydraulic lines 37 of all of the cylinders 35 and the other being connected to the hydraulic lines 38 of all of the cylinders, these headers being converted alternately into pressure and suction headers, in accordance with the phase of operation of the platen 11, under the control of the valve 63 and the pumps 64 and 65.

The hydraulic cylinders 32 operating the cam plates 31 may be similarly controlled from the control panel 60.

The control system can be designed for automatic operation, so that once the stock A has been threaded through the machine, it would operate automatically to provide the predesignated cure through timers, to move at the proper times the belts 16 and 17 and the required distance corresponding to the length of the press 10, to move the stock A through the press 10 in successive segments to operate the cam plates 31 in and out and to operate the upper platen 11 cyclically up and down, all of these operations being automatically correlated and continued until a signal device advises that the end of the run has been reached, during which the entire stock A, except its end sections, has been cured.

If desired, the means for moving the tensioning rolls 43 and 52 may be electrically connected to the control system described to effect automatic tensioning movement of these rolls downward before and after cure, but while the stock A is stationary, and may be moved in tension releasing position during the movement of the stock through the press 10.

Although the edging bands 28 have been shown endless and wrapped around the belt 17, as far as certain aspects of the invention are concerned, these edging bands may consist of sections of definite lengths extending along the upper run of the belt 17 and movable only transversely towards and away from each other. In that case the edging bands need not be flexible and may be of metal.

Although the machine has been described in connection with the use of edging bands 28, as far as certain aspects of the invention are concerned, these bands or other edging irons may be dispensed with, for example, in cases where the stock A is comparatively wide, and where the edges of the stock after curing is to be trimmed and the stock is to be slit into various widths.

Also, in cases where the stock would not stick to the upper platen 11 in the absence of the upper belt 16, this belt, as far as certain broader aspects of the invention are concerned, may be dispensed with.

While the invention has been described with particular reference to a specific embodiment, it is to be understood that it is not to be limited thereto but is to be construed broadly and restricted solely by the scope of the appended claims:

We claim:

1. An apparatus for curing a ribbonlike stock of curable material in successive longitudinal segments, comprising a bed press having first and second opposed platens presenting confronting first and second substantially flat pressing surfaces respectively, means for moving said platens relatively towards and away from each other to close and open said press, means for heating said press to stock-curing temperature, a first endless conveyor belt surrounding said first platen and having a straight run extending along said first pressing surface in face to face contact with said first pressing surface in the closed position of said press, a pair of endless parallel edging bands frictionally retained by said first conveyor belt for longitudinal movement therewith and extending around and along said conveyor belt, means for adjusting the distance between said edging bands along said first pressing surface to bring said edging bands into contact with the stock and for maintaining said edging bands at said distance for successive curing cycles of said apparatus, said edging bands and said first conveyor belt jointly defining a heat-curing trough along said conveyor belt for the stock, a second endless conveyor belt surrounding said second platen and having a straight run extending along said second pressing surface in face to face contact with said second pressing surface in the closed position of said press, means for advancing the raw stock intermittently in successive segments longitudinally into the open press into position between said belt runs to cause the platens to press opposite faces of the segment of raw stock in said press when the press is closed, and for advancing at the same time the segment of the cured stock out of the open press, and means for advancing said conveyor belts longitudinally at a linear speed corresponding to the linear speed of advancement of said stock to and from the open press, to cause said belts and said stock to move in tandem through the open press, said stock advancing means having means for guiding the cured stock away from said belts as the cured stock is advanced away from the press, to cause the cured stock adhering to said belts to be stripped automatically therefrom.

2. An apparatus as described in claim 1 wherein said means for adjusting said edging bands comprises a pair of cam plates for moving said edging bands toward each other for the run along said first pressing surface until said edging bands contact the raw stock and means for moving said edging bands away from each other after the run along said pressing surface is completed so that the separation of the edging bands from the stock is facilitated and the spacing between said edging bands will be greater than the width of the raw stock prior to the beginning of the run along said first pressing surface.

3. An apparatus as described in claim 2, said stock advancing means for tensioning the segment of stock in said press.

4. An apparatus as described in claim 1, said stock advancing means comprising means for tensioning the segment of stock in said press.

5. An apparatus as described in claim 4, said stock advancing means comprising two sets of stock guiding rolls at opposite ends of said press, each of said roll sets having a roll movable into position to tension the segment of stock between said movable rolls.

6. An apparatus as described in claim 1, comprising control means for automating and automatically correlating the different operations of said apparatus (1) to cause said press to remain closed on a segment of said stock for a period to cure said segment, while said conveyor belts and said stock advancing means are immobilized, (2) to move said platens relatively apart at the end of each of said periods to open the press, (3) to operate said conveyor belts and said stock advancing means in unison when said press has been opened to move the cured segment of the stock out of the press and to move the next raw segment of the stock into the press, (4) to immobilize said conveyor belts and said stock advancing means after said next successive raw segment of the slack has been advanced into the press, and (5) to move said platens relatively in position to close said press on the raw segment of the stock therein.